United States Patent
Brookey et al.

[19]

[11] Patent Number: 6,123,159

[45] Date of Patent: *Sep. 26, 2000

[54] APHRON-CONTAINING WELL DRILLING AND SERVICING FLUIDS OF ENHANCED STABILITY

[75] Inventors: Tommy F. Brookey, Edmond, Okla.; Roy F. House, Houston, Tex.

[73] Assignee: Actisystems, Inc., Edmond, Okla.

[ * ] Notice: This patent is subject to a terminal disclaimer.

[21] Appl. No.: 09/121,713

[22] Filed: Jul. 24, 1998

Related U.S. Application Data

[63] Continuation-in-part of application No. 08/800,727, Feb. 13, 1997, Pat. No. 5,881,826, and application No. PCT/US98/02566, Feb. 10, 1998.

[51] Int. Cl.$^7$ .............................. C09K 7/02; E21B 21/00; E21B 33/138

[52] U.S. Cl. ........................... 175/72; 166/294; 507/102; 507/110; 507/202

[58] Field of Search .................................. 166/292, 294; 175/72; 507/102, 110, 202

[56] References Cited

U.S. PATENT DOCUMENTS

| | | | |
|---|---|---|---|
| 2,713,029 | 7/1955 | Fuller | 507/110 |
| 2,818,230 | 12/1957 | Davis | 175/69 |
| 4,486,333 | 12/1984 | Sebba | 516/14 |
| 5,513,712 | 5/1996 | Sydansk | 507/102 X |
| 5,616,541 | 4/1997 | Dobson, Jr. et al. | 507/145 |
| 5,682,951 | 11/1997 | Sydansk | 166/292 |
| 5,716,910 | 2/1998 | Totten et al. | 507/102 |
| 5,881,826 | 3/1999 | Brookey | 175/72 |
| 5,916,849 | 6/1999 | House | 507/110 |

*Primary Examiner*—George Suchfield
*Attorney, Agent, or Firm*—Roy F. House

[57] ABSTRACT

The invention provides a method and fluid for drilling or servicing a well in a subterranean formation, particularly containing lost circulation zones or depleted, low pressure reservoirs. A method of decreasing the density of the fluid circulated in a borehole, decreasing the invasion of fluid into formations contacted by the fluid, or decreasing the lost circulation potential of the fluid is provided by using as the fluid an aqueous liquid having dispersed therein a polymer which increases the low shear rate viscosity of the fluid to the extent that the shear thinning index of the fluid is at least about 10, a surfactant, and aphrons, wherein the aphrons are preferably generated by the turbulence and pressure drop as the fluid exits the drill bit in the vicinity of the formation, the fluid having a low shear rate viscosity of at least 10,000 centipoise. The fluid additionally contains an oligosaccharide mixture composed of pentosans and/or hexosans containing from one to about 10 combined sugar units selected from the group consisting of arabinose, mannose, galactose, glucose, xylose, cellobiose, and mixtures thereof. Preferably the oligosaccharide mixture is the water soluble portion of thermally hydrolyzed lignocellulose.

13 Claims, No Drawings

APHRON-CONTAINING WELL DRILLING AND SERVICING FLUIDS OF ENHANCED STABILITY

The present patent application is a continuation-in-part of U.S. Ser. No. 08/800,727 filed Feb. 13, 1997, now U.S. Pat. No. 5,881,826, and PCT Application Number PCT/US98/02566 filed Feb. 10, 1998.

BACKGROUND OF THE INVENTION

Formation damage due to invasion by drilling fluids is a well known problem. Many zones contain formation clays which hydrate when in contact with water such as the filtrate from drilling fluids. These hydrated clays tend to block the producing zones, primarily sands so that oil and gas cannot move to the borehole and be produced.

These zones are also damaged by solids which are carried into the openings with the fluid. The movement of drilling fluids and filtrate through these openings also causes the dislodging and migration of solids in place in the formation. These solids can lodge and block movement of produced hydrocarbons.

Invasion is caused by the differential pressure of the hydrostatic column which is generally greater than the formation pressure, especially in low pressure or depleted zones. Invasion is also due to the openings in the rock and the ability of fluids to move through the rock, the porosity and permeability of the zone.

Because of this differential pressure, drillers have long used filtrate control mechanisms to control the movement of drilling fluids and filtrate into and through the formation openings. This mechanism involves adding particles to the drilling fluid, which are then deposited onto the borehole wall while circulating and drilling. These particles are generally some combination of bentonite, starch, lignins, polymers, barite, and drilled solids. They are used to plug and seal the borehole due to the particle size and shape, and some control is also due to the viscosity of the filtrate when water soluble polymers are used. Although this wallcake forms a semipermeable barrier, some filtrate moves through and into the zone both before and after the wallcake is formed.

Wallcake control, then is not complete and some filtrate water is allowed to contact the producing zone. Another disadvantage of wallcake mud is that when filtrate moves through, the solids are screened out and left in the cake. This causes the cake to become thicker and can lead to differential sticking of the drill string.

More recent technology has seen the development of Low Shear Rate Viscosity (LSRV) fluids. LSRV is created by the addition of specialized polymers to water or brines to form a drilling fluid. These polymers have a unique ability to create extremely high viscosity at very low shear rates. These LSRV fluids have been widely used because of their carrying capacity and solids suspension ability. They have been accepted as a way to minimize cuttings bed formation in high angle and horizontal wells, and as a way to reduce barite sag in high weight muds.

Recent studies and field experience indicate that this LSRV is helpful in controlling the invasion of drilling fluids and filtrate by creating a high resistance to movement into the formation openings. Since the fluid moves at a very slow rate, viscosity becomes very high, and the drilling fluid is contained within the borehole with a very slight penetration. This has been beneficial in protecting the zones from damage as well as reducing differential sticking in these fluids.

See for example the article entitled "Drill-In Fluids Improve High Angle Well Production", Supplement to the Petroleum Engineer International, March 1995.

Lost circulation is also a severe problem in rotary drilling. Lost circulation occurs when the differential pressure of the hydrostatic column is much greater than formation pressure. The openings in the rock are able to accept and store drilling fluid so that none is returned to surface for recirculation. The fluid is lost downhole and can become an expensive and dangerous problem. Lost circulation can lead to hole instability, stuck drill pipe, and loss of well control. At the least, it halts drilling operations and requires expensive replacement volume to be used.

In addition to the fluid volume being lost, expensive lost circulation materials (LCM) are required. These are usually fibrous, granular, or flake materials such as cane fibers, wood fibers, cottonseed hulls, nut hulls, mica, cellophane, and many other materials. These LCM materials are added to the fluid system so that they may be carried into the loss zone and lodge to form a bridge on which other materials may begin to build and seal. These LCM materials themselves are damaging to the zones, and because they must be carried many times in the drilling fluid to maintain circulation, solids removal is halted and high solids mud results.

Methods of correcting lost circulation of drilling fluids by aerating the drilling fluids are set forth in U.S. Pat. No. 2,818,230 (Davis) and U.S. Pat. No. 4,155,410 (Jackson).

The use of underbalanced drilling has increased as the development of low pressure formations has acquired more importance. Horizontal drilling, in particular, has increased the need to drill across zones that are not only low pressure, but highly fractured or permeable. The exposure of numerous fractures or openings having low formation pressures has increased the problem of lost circulation and formation invasion. The necessity of down hole tools many times preclude the use of bridging materials to stop these losses. This has led to the use of underbalanced drilling techniques to control the losses and invasion of these zones. Some of these techniques include the use of air, mist, foam, stable foam, and air-entrained drilling fluids. Problems with these fluids include hole cleaning, control of formation fluids, corrosion, and requirements for expensive, often hard to get equipment such as compressors and boosters. Such fluids are not re-circulateable and must be constantly generated and circulated within the wellbore as the drilling proceeds. The book entitled "Underbalanced Drilling Manual" published by the Gas Research Institute, Chicago, Ill., U.S.A. (GRI Reference No. GRI-97/0236), 1997, is an excellent reference for underbalanced drilling techniques and fluids.

It has been proposed in co-pending U.S. patent application Ser. No. 08/800,727, incorporated herein by reference, to provide re-circulateable, aphron-containing, elevated low shear rate viscosity fluids for controlling the invasion of fluids into subterranean formations contacted by the fluids.

SUMMARY OF THE INVENTION

The present invention provides a means of increasing the stability of fluids containing low shear rate viscosity generating polymers, surfactants, and colloidal gas aphrons in a re-circulateable well drilling and servicing fluid. The stability is enhanced by incorporating into the fluids an oligosaccharide mixture as more particularly disclosed herein. The aphrons use encapsulated air available in most circulating fluids. The aphrons reduce the density of the fluid and provide a means of bridging and sealing of the formations contacted by the fluid as the bubbles expand to fill the openings exposed while drilling. The low shear rate polymers strengthen the microbubble and also provide a resistance to movement within the formation so that losses of fluid are substantially reduced as the formation is being drilled. In this way, lost circulation is prevented. Any fluid which enters the formation is clean and essentially solids-free such that damage of the formation is significantly less than with solids-containing fluids. Since no solids or particles are involved in this method, solids removal equipment can be used to keep the fluid as clean as possible.

It is an object of this invention to provide recirculateable, enhanced low shear rate viscosity (hereinafter abbreviated to "ELSRV"), aphron-containing well drilling and servicing fluids which have enhanced stability.

It is another object of this invention to provide a method of bridging and sealing subterranean formations at the surface of a borehole during well drilling and servicing operations.

These and other objects of the invention will be obvious to one skilled in the art upon reading this specification and claims.

The process can comprise, consist essentially of, or consist of the stated steps with the stated materials. The compositions can comprise, consist essentially of, or consist of the stated materials.

DESCRIPTION OF THE PREFERRED EMBODIMENTS OF THE INVENTION

The recirculateable well drilling and servicing fluids of this invention comprise an aqueous liquid having a water soluble polymer hydrated therein and a surfactant. The polymers useful in the ELSRV fluids of this invention are such that the ELSRV fluids have a "shear thinning index" of at least 10, wherein the shear thinning index is the ratio of the Brookfield viscosity at 0.5 rpm to the Brookfield viscosity at 100 rpm. The shear thinning index is indicative of the shear thinning characteristics of the fluid. ELSRV fluids will have a low shear rate viscosity (LSRV) at 0.5 rpm on the Brookfield viscometer of at least 10,000 centipoise. ELSRV fluids will have a low shear rate viscosity (LSRV) at 0.5 rpm on the Brookfield viscometer of at least 10,000 centipoise.

The base aqueous fluid in which the low shear rate modifying polymer is hydrated may be any aqueous liquid which is compatible with the polymer. Thus the base liquid may be fresh water, or a brine containing soluble salts such as sodium chloride, potassium chloride, calcium chloride, sodium bromide, potassium bromide, calcium bromide, zinc bromide, sodium formate, potassium formate, cesium formate, and the like. The brine may contain one or more soluble salts at any desired concentration up to saturation.

The polymers useful in the ELSRV fluids of this invention comprise any water soluble polymer which increases the low shear rate viscosity of the fluid to produce a fluid exhibiting a high yield stress, shear thinning behavior. Particularly useful are biopolymers produced by the action of bacteria, fungi, or other microorganisms on a suitable substrate. Exemplary biopolymers are the polysaccharides produced by the action of Xanthomonas compestris bacteria which are known as xanthan gums. These are available commercially from several sources including: Kelco Oil Field Group, Inc., under the trademarks "Xanvis" and "Kelzan"; Rhone-Poulenc Chimie Fine, under the trademark "Rhodopol 23-p"; Pfizer Inc., under the trademark "Flocon 4800C"; Shell International Chemical Company of London, U.K., under the trademark "Shellflo ZA"; and Drilling Specialties Company, under the trademark "Flowzan." See for example U.S. Pat. No. 4,299,825 and U.S. Pat. No. 4,758,356 each incorporated herein by reference. Other biopolymers useful in the fluids of this invention are the so-called welan gums produced by fermentation with a microorganism of the genus Alcaligenes. See for example U.S. Pat. No. 4,342,866, incorporated herein by reference. Gellan gums are disclosed in U.S. Pat. No. 4,503,084, incorporated herein by reference. Schleroglucan polysaccharides produced by fungi of the genus sclerotium are disclosed in U.S. Pat. No. 3,301,848, incorporated herein by reference. Commercially available schleroglucan is sold under the trademarks "Polytran" from the Pillsbury Company and "Actigum CS-11" from CECA S.A. Succinoglycan polysaccharides are produced by cultivating a slime-forming species of Pesudomonas, Rhizobium, Alcaligenes or Agrobacterium, e.g., Pseudomonas sp. NCIB 11264, Pseudomonas sp. NCIB 11592 or Agrobacterium radiobacter NCIB 11883, or mutants thereof, as described in European Patent No. A40445 or A138255. Commercially available succinoglycan biopolymer is sold by Shell International Chemical Company of London, U.K., under the trademark "Shellflo-S".

The ELSRV of the fluids of this invention is provided by the polymeric viscosifier as the aphrons provide little viscosity enhancement in the fluid. This is contrast to the viscosity of high quality stable foams in which the encapsulated gas contributes to the viscosity of the fluid.

The minimum concentration of the polymer required to increase the low shear rate viscosity of the fluid can be determined by routine testing. The LSRV must be at least 10,000 centipoise, preferably at least 20,000 centipoise, and most preferably at least 40,000 centipoise. We have found that the retention of the aphrons in the fluid increases as the LSRV increases. Moreover, as the LSRV increases, the tendency of the fluid to form large foam bubbles on the surface of the fluid after the fluid is circulated in the borehole is decreased. Thus the minimum concentration will be an amount sufficient to impart to the fluid the desired low shear rate viscosity. Generally the fluids will contain a concentration from about 0.7 kg/m$^3$ (0.25 ppb) to about 17.1 kg/m$^3$ (6 ppb), referably from about 1.4 kg/m$^3$ (0.5 ppb) to about 14.3 kg/m$^3$ (5 ppb).

The water base borehole fluids of this invention generally may contain materials well known in the art to provide various characteristics or properties to the fluid. Thus the fluids may contain one or more viscosifiers or suspending agents in addition to the polysaccharide required, weighting agents, corrosion inhibitors, soluble salts, biocides, fungicides, seepage loss control additives, bridging agents, deflocculants, lubricity additives, shale control additives, and other additives as desired.

The borehole fluids may contain one or more materials which function as encapsulating or fluid loss control additives to further restrict the entry of liquid from the fluid to the contacted shale. Representative materials known in the art include partially solubilized starch, gelatinized starch, starch derivatives, cellulose derivatives, humic acid salts (lignite salts), lignosulfonates, gums, synthetic water soluble polymers, and mixtures thereof.

The fluids may contain a weighting agent such that the base fluid without aphrons has a density from about one gram per cubic centimeter to about 2.3 grams per cubic centimeter.

The fluids of this invention generally have a pH in the range from about 7.0 to about 11.5, preferably from 8 to about 11. The pH can be obtained as is well known in the art by the addition of bases to the fluid, such as potassium hydroxide, potassium carbonate, potassium humate, sodium hydroxide, sodium carbonate, sodium humate, magnesium oxide, calcium hydroxide, zinc oxide, and mixtures thereof. The preferred base is magnesium oxide.

The surfactants, i.e., surface active foaming agents, useful in the present invention to create the aphrons must be compatible with the polymers present in the fluid to create the desired low shear rate viscosity. Thus the surfactants will generally be non-ionic or anionic. Preferred surfactants are selected from the group consisting of sulfated alcohol ethoxylates, alpha olefin sulfonates, alkyl sulfates, phosphate esters, alkyl betaines, ethoxylated glycoside esters, ethoxylated alkyl glycosides, and mixtures thereof. A test procedure has been devised to determine if a surfactant can be used in the present invention to generate the aphrons. The procedure is as follows:

To a low temperature, low pressure API filtration cell (API Recommended Practice 13 B-1), the cylindrical body of which is made from Plexiglas of thickness 0.5 inch (1.3 centimeters), is added 200 grams of sand having a particle size in the range from 50 mesh to 70 mesh (297 $\mu$m to 210 $\mu$m). This provides a sand bed depth of 2.1 centimeters. No filter paper is used in the cell. 350 cc of the fluid to be tested is slowly added to the cell, the cell assembled, and 100 psi nitrogen pressure applied. The pressure is released after the nitrogen blows through the bed for 30 seconds. Upon releasing the pressure the sand bed will expand in volume/height as the bubbles in the sand bed expand. The expansion is not even, and an average increase in height of the bed as measured at the cell wall and at the center of the sand bed is obtained. Surfactants which increase the sand bed by at least 50% are considered to be preferred for the generation of aphrons in the present invention. Test Fluid: contains 1.5 pounds per 42 gallon barrel (4.285 kg/m$^3$) of well hydrated xanthan gum in water and 1 pound per 42 gallon barrel (2.857 kg/m$^3$) of surfactant to be tested. The surfactant is dispersed in the xanthan gum dispersion by spatulation to prevent the generation of foam. Solid surfactants are first dissolved in an appropriate water dispersible or soluble solvent before adding them to the xanthan gum dispersion.

The book by Felix Sebba entitled "Foams and Biliquid Foams—Aphrons", John Wiley & Sons, 1987, incorporated herein by reference, is an excellent source on the preparation and properties of microbubbles.

An aphron is made up of a core which is often spherical of an internal phase, usually liquid or gas, encapsulated in a thin aqueous shell. This shell contains surfactant molecules so positioned that they produce an effective barrier against coalescence with adjacent aphrons.

The aphrons when first generated contain a wide size distribution ranging up to about 200 $\mu$m in diameter. At atmospheric pressure, the aphrons of very small diameter diminish very rapidly leaving aphrons in the 25 $\mu$m to about 200 $\mu$m size range. This is due to the excess pressure within the aphrons which increases as the diameter of the aphrons decreases. Thus the smaller aphrons will tend to diminish in size by transferring their gas to the larger ones which would have a lower excess pressure.

In the case of the aphron-containing well drilling and servicing fluids of the present invention, the aphrons are generated downhole as the fluid exits the drilling bit. The fluid is under considerable pressure composed of hydrostatic as well as pressure loss created by the circulating system. It is believed that this fluid pressure compensates for the excess pressure within the aphrons such that the aphrons smaller than about 25 $\mu$m are stabilized for a period of time until they are circulated up the borehole. The aphrons thus are able to penetrate within the pore spaces of the exposed formation where they can expand, because of the lower pore pressure within the formation, and seal the pore spaces from the entry of any fluid. Microfractures and the like will be filled with aphrons which likewise expand within the formation to seal the microfractures.

Increases in vapor pressure due to pressure drops, temperature increases, and cavitation are common in downhole conditions. Certain solvents which may be present in the fluid may also effect vapor pressure to provide gasses needed to form aphrons.

Aphrons large enough to be seen without magnification can be visually observed in the fluid as it flows from the borehole into the surface holding tanks ("pits") before being recirculated. Generally the fluid flows across a screen to remove the drill cuttings. Screens as fine as 200 mesh (74 $\mu$m screen openings) can be used with the fluids of the present invention. Aphrons greater than the screen size will be removed from the fluid. If desired, the particle size of the aphrons in the fluid can be determined with various particle size analyzers which are commercially available. See for example the following articles: (1) "Microbubbles: Generation and Interaction with Colloid Particles", James B. Melville and Egon Matijevic, Chapter 14 in "Foams", R. J. Akers, editor, Academic Press, 1976; (2) "Separation of Organic Dyes from Wastewater by Using Colloidal Gas Aphrons", D. Roy, K. T. Valsaraj, and S. A. Kottai, Separation Science and Technology, 27(5), pp. 573–588 (1992). These articles are incorporated herein by reference.

Upon being recirculated down the drill string and through the bit additional aphrons are generated provided the concentration of the surfactant is sufficient. It is desirable to add additional surfactant to the fluid either continuously or intermittently until the desired quantity of aphrons is produced.

The quantity of aphrons desired in the fluid depends on the density reduction required. Thus the density of the circulating fluid can be monitored on the surface and additional surfactant added as necessary to maintain the desired density. The fluids contain at least 60 volume % of the liquid phase, preferably at least 70 volume % of the liquid phase, and most preferably more than 80 volume % of the liquid phase of the aphron-containing fluid at atmospheric pressure.

The concentration of surfactant required in any case is less than the critical micelle concentration (CMC) of the surfactant. Generally a concentration of surfactant from about 0.03% by volume to about 0.4% by volume, depending on the particular surfactant present in the fluid, is required, preferably from about 0.05% to about 0.3% by volume assuming the surfactant contains about 80% by weight solids.

If desired, the aphrons can be generated on the surface using the procedures and equipment set forth in the following U.S. patents, incorporated herein by reference: Sebba U.S. Pat. No. 3,900,420 and Michelsen U.S. Pat. No. 5,314,644. The well drilling and servicing fluid containing the aphrons can then be continuously circulated in the borehole.

The so-called water soluble polymer present in the fluid to enhance the low shear rate viscosity of the fluid also helps to stabilize the aphrons, thus helping to prevent their coalescence.

It is preferred that the surfactant be added to the drilling and well servicing fluid under pressure by pumping the surfactant into the fluid.

If necessary, air or other gas can be incorporated into the fluid to entrain more gas for forming the aphrons as the fluid exits the drill bit at the bottom of the borehole. Thus a mixer can be operated in the mud pits to incorporate more air into the fluids.

The aphron-containing fluids of this invention are useful in any drilling or well servicing operations wherein it is desired to decrease hole problems related to lost circulation, shale stability, and the like. Thus the fluids may be weighted, either with solids or water soluble salts, to provide the density desired after generation of the aphrons. Such fluids may be utilized in underbalanced drilling, overbalanced drilling, or even at balance drilling operations.

It has been determined as disclosed herein that the low shear rate viscosity of the re-circulateable, ELSRV fluids disclosed hereinbefore decreases upon aging at elevated temperatures. Thus additional polysaccharide must be added to the fluids to maintain the ELSRV.

We have found that the addition of an oligosaccharide mixture to the polysaccharide-containing ELSRV fluids increases the thermal stability of the fluids, particularly decreasing the thermal breakdown of the LSRV of the fluids. This correspondingly increases the stability of the re-circulateable, ELSRV fluids of this invention.

The preferred oligosaccharide mixture (hereinafter sometimes referred to as "OSM") useful in the present invention consists primarily of pentosans and hexosans containing from one to about ten combined sugar units, more preferably from one to about five sugar units, and is preferably the water soluble portion of thermally hydrolyzed lignocellulose. Such an OSM is composed of arabinose, mannose, galactose, glucose, and xylose sugar units. Other OSM can be obtained by the degradation of other polysaccharides, such as starch, gums, cellulose, hemicellulose, and the like by known processes, including acid hydrolysis, thermal hydrolysis, biological conversions, and the like. Thus, for example, syrups obtained from corn and sugar cane can be used as the OSM in this invention.

In its broadest aspects, the OSM is composed of pentosans and/or hexosans containing from one to about ten combined sugar units selected from the group consisting of arabinose, mannose, galactose, glucose, xylose, cellobiose, and mixtures thereof.

As indicated the preferred oligosaccharide useful in the present invention is preferably obtained from the thermal hydrolysis of lignocellulose materials. The thermal hydrolysis may be carried out in any one of several manners such as by subjecting wood of trees and woody materials of corn stalks, cane, and other vegetable growths to the action of steam under elevated temperatures and pressures. The OSM may also be obtained by acid hydrolysis of lignocelluloses as well as by saccharification of wood. Preferably, however, the thermal hydrolysis is carried out by charging wood chips to a closed chamber (e.g., a gun as set forth in Mason U.S. Pat. No. 1,824,221, incorporated herein by reference), subjecting the chips to pressure of about 200–1200 pounds per square inch and a temperature of about 200–300° C. for approximately 30 minutes to 5 seconds, respectively, in the presence of steam, and then discharging the woody material from the gun through a constricted discharge means therein into a zone of lower pressure, preferably atmospheric pressure, thereby exploding the wood chips into comparatively finely divided elongated fibers. Under this treatment the wood undergoes hydrolysis, and water-insoluble and readily hydrolyzable constituents thereof are rendered soluble or dispersible in water. These water solubles are removed from the fiber, which may be accomplished by washing the fiber in water or by squeezing the fiber with rolls and/or screws and the like apparatus. See for example Boehm U.S. Pat. No. 2,224,135, incorporated herein by reference. The water solubles can be concentrated or rendered solid by removing water therefrom, as by evaporation, drying, etc.

Water solubles resulting from such hydrolysis of lignocellulose materials as a class are preferred for use in this invention. A typical analysis of the water solubles, the preferred OSM of this invention, made from pine wood is as follows: hexosans and pentosans, 70% by weight; lignin, 15% by weight; non-sugar carbohydrates, 10% by weight; and gums, 5% by weight. The constituents of the OSM will vary somewhat depending on the type of lignocellulose material hydrolyzed and the conditions, e.g., time, temperature, pressure, etc. Depending upon these conditions, the constituents of the OSM can vary roughly as follows: pentosans and hexosans, 60–80% by weight; lignin, 5–25% by weight; non-sugar carbohydrates, 5–15% by weight; and gums, 2–8% by weight. The pentosans and hexosans contain primarily from one to about five combined sugar units composed of arabinose, mannose, galactose, glucose, and xylose sugar units.

It has been disclosed in Fuller U.S. Pat. No. 2,713,029 and Brink et al. U.S. Pat. No. 2,713,030 that the addition of small amounts of the preferred OSM to clay-water drilling mud systems, such as from about 0.07–1.75 pounds of OSM per 42 gallon barrel of mud, imparts low viscosity and gel strength thereto.

Incorporation of the OSM into aqueous ELSRV well drilling and servicing fluids which contain one or more polysaccharides hydrated (solublized or dispersed) therein enhances the thermal stability of the fluids as measured by the low shear rate viscosity, i.e., the viscosity at less than about one $sec^{-1}$.

The minimum concentration of the OSM incorporated into the aqueous polysaccharide-containing fluids is that amount, as determined by routine testing, which increases the thermal stability of the fluid. In the case of ELSRV fluids, this is determined by evaluating the low shear rate viscosity of the fluid after aging at the desired temperature and comparing the results obtained with those of the fluid which does not contain the OSM.

Generally the concentration of the OSM will be from about 0.7 $kg/m^3$ (0.25 ppb) to about 428 $kg/m^3$ (150 ppb), preferably from about 1.4 $kg/m^3$ (0.5 ppb) to about 171 $kg/m^3$ (60 ppb), most preferably from about 2.85 $kg/m^3$ (1.0 ppb) to about 57 $kg/m^3$ (20 ppb).

In order to more completely describe the invention, the following illustrative, non-limiting examples are given. In these examples and in this specification, the following abbreviations may be used: cc=cubic centimeters; $kg/m^3$= kilogram per cubic meter; ppb=pounds per 42 gallon barrel; $\mu$m=micrometer (micron); $sec^{-1}$=reciprocal seconds; lbm/bbl=pounds per 42 gallen barrel; psi=pounds per square inch; rpm=revolutions per minute; LSRV=low shear rate viscosity in centipoise as determined with a Brookfield Viscometer at 0.5 rpm; STI=the shear thinning index obtained with a Brookfield Viscometer, which is the ratio of the 0.5 rpm viscosity to the 100 rpm viscosity; ELSRV= enhanced low shear rate viscosity; LCM=lost circulation material; CMC=critical micelle concentration; API= American Petroleum Institute; OSM=oligosaccharide mixture as set forth hereinbefore.

EXAMPLE 1

Fluids were prepared containing 4.285 kg/m3 (1.5 lbm/bbl) of xanthan gum biopolymer, 5.714 kg/m3 (2.0 lbm/bbl) magnesium oxide pH buffer, and 2.857 kg/m3 (1.0 lbm/bbl) BLUE STREAK surfactant (available from ActiSystems, Inc., Edmond, Okla., U.S.A.), and either none or 28.57 kg/m3 (10 lbm/bbl) of the preferred OSM as indicated in Table 1. The initial Brookfield viscosities of the fluids were obtained. The fluids were then static aged for 16 hours at 82.2° C. (180° F.), cooled to ambient temperature, spatulated, and the Brookfield viscosities again obtained. The fluids were re-mixed to incorporate aphrons into the fluids and the Brookfield viscosities obtained. Thereafter the fluids were set quiescent for 20 hours, and the Brookfield viscosities again obtained. The data obtained are set forth in Table 1. [Fluid 1-A which does not contain OSM is not an example of the invention].

The data indicate the excellent stabilizing effect of the OSM on the viscosity of the fluids.

EXAMPLE 2

Fluids were prepared containing 10.0 kg/m³ (3.5 lbm/bbl) of xanthan gum biopolymer, 5.714 kg/m3 (2.0 lbm/bbl) magnesium oxide pH buffer, and 2.857 kg/m3 (1.0 lbm/bbl) BLUE STREAK surfactant (available from ActiSystems, Inc., Edmond, Okla., U.S.A.), and either none or 28.57 kg/m3 (10 lbm/bbl) of the preferred OSM as indicated in Table 2. The initial Brookfield viscosities and densities of the fluids were obtained. The fluids were then static aged for 16 hours at 82.2° C. (180° F.), cooled to ambient temperature, spatulated, and the Brookfield viscosities and densities again obtained. The fluids were re-mixed to incorporate aphrons into the fluids and the Brookfield viscosities and densities obtained. Thereafter the fluids were set quiescent for 20 hours, and the Brookfield viscosities and densities again obtained. The data obtained are set forth in Table 2. [Fluid 2-A which does not contain OSM is not an example of the invention].

The data indicate the excellent stabilizing effect of the OSM on the viscosity and density of the fluids.

TABLE 1

| Fluid | 1-A | 1-B |
|---|---|---|
| OSM, lb/bbl | 0 | 10 |
| INITIAL RHEOLOGY | | |
| 0.5 rpm, cp | 20,600 | 22,400 |
| 100 rpm, cp | 376 | 292 |
| STI | 55 | 77 |
| RHEOLOGY AFTER AGING 16 HOURS AT 82.2° C. | | |
| 0.5 rpm, cp | 4400 | 21,000 |
| 100 rpm, cp | 152 | 257 |
| STI | 29 | 82 |
| RHEOLOGY AFTER RE-MIXING TO INCORPORATE APHRONS | | |
| 0.5 rpm, cp | 9200 | 20,320 |
| 100 rpm, cp | 354 | 380 |
| STI | 26 | 54 |
| RHEOLOGY AFTER REMAINING QUIESCENT FOR 20 HOURS | | |
| 0.5 rpm, cp | 4560 | 18,800 |
| 100 rpm, cp | 152 | 260 |
| STI | 30 | 72 |

TABLE 2

| Fluid | 2-A | | | | 2-B | | | |
|---|---|---|---|---|---|---|---|---|
| Fluid Treatment* | A | B | C | D | A | B | C | D |
| Brookfield Viscosity | | | | | | | | |
| 0.5 rpm, cp | 71000 | 44700 | 52000 | 45000 | 76000 | 88600 | 74000 | 70400 |
| 100 rpm, cp | 835 | 600 | 760 | 633 | 845 | 890 | 860 | 819 |
| STI | 85 | 75 | 68 | 71 | 90 | 100 | 86 | 86 |
| Fann Rheology | | | | | | | | |
| 600 rpm | 63 | 46.5 | 57 | 47.5 | 77 | 75 | 73 | 73 |
| 300 rpm | 53 | 42 | 49 | 42 | 63 | 63 | 62 | 61 |
| 200 rpm | 49 | 40.5 | 47 | 40 | 57.5 | 61 | 55.5 | 55 |
| 100 rpm | 44 | 38.5 | 42 | 38 | 50 | 52.5 | 48.5 | 48 |
| 6 rpm | 32 | 32 | 32.5 | 31 | 35 | 37.5 | 35.5 | 35 |
| 3 rpm | 30 | 29 | 29.5 | 28 | 32.5 | 35 | 32 | 32 |
| Density, g/cc | 0.61 | 1.0 | 0.61 | 0.91 | 0.67 | 0.89 | 0.70 | 0.80 |

*FLUID TREATMENT: A = Initial Data; B = Fluids Static Aged 16 hr @ 180° F.; C = Fluids Re-Mixed; D = Fluids Aged 20 hr @ 72° F.

EXAMPLE 3

Surfactants were screened for use in the present invention using the test procedure set forth hereinbefore. The average percent increase in height of the sand bed is as follows:

| Surfactant | % Increase |
|---|---|
| Sodium dioctyl sulfosuccinate | 118.8 |
| Chubb National Foam-High Expansion | 96.4 |
| Alpha olefin sulfonate | 63.7 |
| Ethoxylated 2,4,7,9-tetramethyl-5-decyn-4,-diol | 56.0 |
| Linear $C_9$–$C_{11}$ alcohol ethoxylates, ave. 6 moles EO/mole | 56.0 |
| Tetrasodium N-(1,2-dicarboxyethyl)-N-octadecyl sulfosuccinate | 50.6 |
| Mixture of diethanolamides of fatty acids | 50.0 |
| Sodium disopropyl naphthalene sulfonate | 38.1 |
| Linear $C_{12}$–$C_{15}$ alcohol ethoxylates, ave. 7 moles EO/mole | 38.1 |
| Modified alkyl ether sulfate | 28.6 |
| Ethoxylated Octadecylamine-Octadecylguanidine complex | 19.0 |

-continued

| Surfactant | % Increase |
|---|---|
| Ethoxylated (20 moles) methyl glucoside sesquistearate | 19.0 |
| 2,4,7,9-tetramethyl-5-decyne-4,7-diol | <10 |
| Ethoxylated (1 mole) nonyl phenol | <10 |
| Sodium alkyl sulfate | <10 |
| Polyoxypropylene-polyoxyethylene block copolymer | <10 |

What is claimed is:

1. In a process of drilling a well wherein a drilling fluid is circulated in a borehole, the drilling fluid comprising an aqueous liquid having dispersed therein a polymer which increases the low shear rate viscosity of the fluid to the extent that the shear thinning index of the fluid is at least about 10 and the low shear rate viscosity is at least 10,000 centipoise, the method of bridging and sealing subterranean formations contacted by the fluid, or decreasing the lost circulation potential of the fluid, which comprises adding to the fluid a surfactant and an oligosaccharide mixture composed of pentosans and/or hexosans containing from one to about 10 combined sugar units selected from the group consisting of arabinose, mannose, galactose, glucose, xylose, cellobiose, and mixtures thereof, and thereafter generating aphrons in the fluid.

2. The process of claim 1 wherein the aphrons are generated by circulating the fluid down the drill pipe and through the openings in the bit whereby the aphrons are generated by the pressure drop as the fluid exits the drill bit and contacts the formation being drilled.

3. The process of claim 1 wherein a gas is mixed into the fluid.

4. The process of claim 1 wherein the surfactant provides an average percent expansion of a sand bed of at least about 50% when evaluated according to the following test procedure: to a low temperature, low pressure API filtration cell (API Recommended Practice 13 B-1), the cylindrical body of which is made from Plexiglas of thickness 0.5 inch (1.3 centimeters) is added 200 grams of sand having a particle size in the range from 50 mesh to 70 mesh (297 $\mu$m to 210 $\mu$m); this provides a sand bed depth of 2.1 centimeters; no filter paper is used in the cell; 350 cc of the fluid to be tested is slowly added to the cell, the cell assembled, and 100 psi nitrogen pressure applied; the pressure is released after the nitrogen blows through the bed for 30 seconds; upon releasing the pressure the sand bed will expand in volume/height as the bubbles in the sand bed expand; the expansion is not even, and an average increase in height of the bed as measured at the cell wall and at the center of the sand bed is obtained; wherein the test fluid comprises 4.285 kg/m$^3$ of well hydrated xanthan gum in water and 2.857 kg/m$^3$ of the surfactant to be tested, wherein the surfactant is dispersed in the xanthan gum dispersion by very low shear mixing to prevent the formation of a foam.

5. The process of claim 1, 2, 3, or 4 wherein the surfactant is injected into the drilling fluid under pressure.

6. The process of claim 1, 2, 3, or 4 wherein the polymer is a biopolymer.

7. The process of claim 1, 2, 3, or 4 wherein the oligosaccharide mixture is the water soluble portion of thermally hydrolyzed lignocellulose.

8. A well drilling and servicing fluid which can be continuously circulated in a borehole comprising an aqueous liquid, a polymer which increases the low shear rate viscosity of the fluid to the extent that the shear thinning index of the fluid is at least 10, a surfactant foaming agent, an oligosaccharide mixture composed of pentosans and/or hexosans containing from one to about 10 combined sugar units selected from the group consisting of arabinose, mannose, galactose, glucose, xylose, cellobiose, and mixtures thereof, and aphrons which are generated by the encapsulation of gas in the fluid by a thin aqueous surfactant-containing shell wherein the surfactant molecules are so positioned that they produce an effective barrier against coalescence with adjacent aphrons, wherein the fluid has a low shear rate viscosity of at least 10,000 centipoise, and wherein the oligosaccharide mixture concentration is sufficient to enhance the thermal stability of the fluid as evidenced by the low shear rate viscosity of the fluid.

9. The well drilling and servicing fluid of claim 8 wherein the polymer is a biopolymer.

10. The well drilling and servicing fluid of claim 8 wherein the oligosaccharide mixture is the water soluble portion of thermally hydrolyzed lignocellulose.

11. The well drilling and servicing fluid of claim 9 wherein the oligosaccharide mixture is the water soluble portion of thermally hydrolyzed lignocellulose.

12. In a method of drilling or servicing a well in a subterranean formation containing lost circulation zones or depleted, low pressure reservoirs wherein a well drilling or servicing fluid is circulated within the wellbore, the method of preventing the loss of circulation therein by using as the well drilling or servicing fluid the fluid of claims 8, 9, 10, or 11.

13. The method of preventing the loss of circulation of claim 12 wherein the surfactant provides an average percent expansion of a sand bed of at least about 50% when evaluated according to the following test procedure: to a low temperature, low pressure API filtration cell (API Recommended Practice 13 B-1), the cylindrical body of which is made from Plexiglas of thickness 0.5 inch (1.3 centimeters) is added 200 grams of sand having a particle size in the range from 50 mesh to 70 mesh (297 $\mu$m to 210 $\mu$m); this provides a sand bed depth of 2.1 centimeters; no filter paper is used in the cell; 350 cc of the fluid to be tested is slowly added to the cell, the cell assembled, and 100 psi nitrogen pressure applied; the pressure is released after the nitrogen blows through the bed for 30 seconds; upon releasing the pressure the sand bed will expand in volume/height as the bubbles in the sand bed expand; the expansion is not even, and an average increase in height of the bed as measured at the cell wall and at the center of the sand bed is obtained; wherein the test fluid comprises 4.285 kg/m$^3$ of well hydrated xanthan gum in water and 2.857 kg/m$^3$ of the surfactant to be tested, wherein the surfactant is dispersed in the xanthan gum dispersion by very low shear mixing to prevent the formation of a foam.

* * * * *